March 30, 1937.  W. A. JOHNSON  2,075,117
CUTTER BAR GUARD RESETTING DEVICE
Filed March 14, 1935
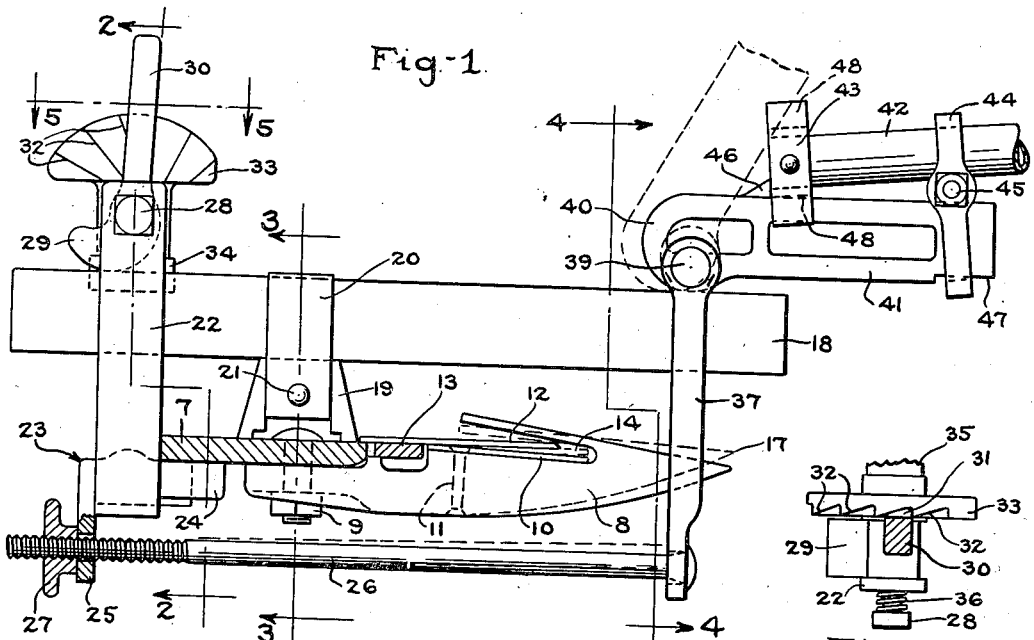
Inventor:
Walter A. Johnson.
By Andrew E. Carlsen
Attorney.

even marked the extent of the following guard bolt 9 bent or forced into the unnatural

UNITED STATES PATENT OFFICE 2,075,117

CUTTER BAR GUARD RESETTING DEVICE

Walter A. Johnson, Rochester, Minn.

Application March 14, 1935, Serial No. 11,043

5 Claims. (Cl. 153—38)

This invention relates to devices for resetting cutter bar guards and ledger plates of mowers, binders, headers, and other machines, using the general type of cutting device in question, and the primary object is to provide means of a novel, efficient, and practical nature for accurately and properly resetting the bent or distorted parts so as to thereby restore the efficiency of the cutting apparatus.

It is well known that the major portion of the troubles met with in cutting equipment of the reciprocating cutter bar type, such as used in mowers and harvesters, is due to the bending downwardly of the guards and ledger plates, thus destroying the proper shearing relationship as between the relatively stationary ledger plate units and the cooperating cutter plate units, and that such bending is caused by the drag or resistance of the crop being cut. The difficulty is particularly pronounced in mowers, where the cutter bar units are not mounted on platforms such as in binders and are therefore weaker in construction, and also because conventional mowers, being frequently used in cutting heavy weeds and on uncultivated land, are subjected to substantially greater strains.

Heretofore it has been customary to bring the sickle members together, and thus close the undesirable vertical spread, by either driving down the upper sickle guides, or hammering up the guard and the ledger plates. The first of these methods is objectionable inasmuch as it causes the sickle to operate in a twisted condition, while the second method is objectionable because of the loosening of the ledger plates caused by sudden blows, and also because of the uncertainty and inaccuracy of such method of adjustment.

In the accompanying drawing, which illustrates a preferred embodiment of the invention:

Fig. 1 is a cross sectional view of a conventional mower cutter bar, showing my improved resetting device applied thereto.

Fig. 2 is a sectional elevation on the irregular line 2—2 in Fig. 1.

Fig. 3 is a sectional elevation on the line 3—3 in Fig. 1.

Fig. 4 is a sectional elevation on the line 4—4 in Fig. 1.

Fig. 5 is a detail, sectional, plan view on the line 5—5 in Fig. 1.

Fig. 6 is an elevation showing how certain parts only of the resetting device shown in Fig. 1 may be used when resetting the cutter bar guards of a binder or other machine where the sickle bar is secured throughout its length to a platform or other frame structure.

Referring to the drawing more particularly and by reference characters, 7 designates the sickle supporting beam of a conventional mower, this beam being usually hinged at one end to the mower cart so that the other or outer end may be swung upwardly to an inclined or vertical position when the mower is not in use, or when it is necessary to raise the cutter bar over obstructions. In any event the beam 7 serves as the sole support for the cutting mechanism, which mechanism includes guards 8 secured to the beam 7 as by bolts 9, a series of ledger plates 10 rigidly secured to the guards 8 as by rivets 11, and a series of cutter plates 12 secured to a bar 13 and mounted for reciprocating action therewith so as to have a shearing action with respect to the ledger plates 10, and operating in conjunction with the ledger plates in an elongated recess 14 in the guard 8. The ledger and cutting plates 10 and 12 respectively are preferably of the usual triangular construction, and the guards 8 following the conventional design are disposed in spaced relationship, pointing forwardly from the supporting beam 7 so as to engage the standing crop to be cut and direct it rearwardly into engagement with the fixed ledger plates and movable cutter plates. All of the parts thus far described are of conventional construction, and are commonly used in practically all types of mowers, such as used on farms, in public parks, and along highways where it is desired to cut down either hay, weeds, or other types of crops.

In the modification shown in Fig. 6, the cutter structure is substantially similar to that shown in Fig. 1, except that the supporting beam or bar 15 is attached directly to the binder platform 16 which extends rearwardly therefrom, and by so doing requires a slightly different method of employing my resetting device inasmuch as the clearance behind the supporting beam is not provided as in a mower structure.

Referring again to Fig. 1, it will be seen that the sole support for the guard 8 is the bolt 9, and for that reason the bolt 9 also serves to support the ledger plates 10 with respect to the beam 7. It will also be noted that the plates 10 and 12 are shown as being slightly spaced apart or out of proper shearing contact with each other, this offset being due to the fact that the forward part of the guard 8 has been forced down from its normal position, which normal position is indicated by the dotted lines 17. It is found that when the guard has been bent or forced into the unnatural position in which it is shown by the full lines, the bending or twisting invariably occurs in the bolt 9, or in some instances in the rearward end part of the guard member proper.

In any event, before the apparatus will function properly it becomes necessary to raise the guard 8, or as many of them as may have been forced into an unnatural position, and this raising can be done in various ways, as already indicated. However, the most efficient method of resetting and truing up the distorted or bent parts of which I have knowledge is that which can be effected by the mechanism herein shown. This mechanism, as illustrated in Figs. 1 to 5, inclusive, may be described as follows:

The main element of the device and with respect to which other parts are adjusted, is a heavy bar 18 which extends transversely across the beam 7 and lengthwise over the guard 8 to be straightened. This beam 18 is of very rigid construction so that it will not be distorted or bent under the high pressure to which it will be subjected when in action.

The beam 18 rests upon a bearing block 19, which block is slidably retained with respect to the beam by a strap member 20 secured to the block as at 21. This block is slidable with respect to the beam so that it may be adjusted to the proper point of contact with the bar 7, as the pressure to be exerted downwardly upon the cutter structure is to be applied through this bearing block at the same time as pressure is brought to bear upwardly against the edge of the bar 7 and against the front ends of the guards 8.

Disposed about the rear end portion of the beam 18 is a generally U-shaped hanger 22 through which the bar 18 passes, and the lower end of which is arranged to receive a bracket designated generally by the numeral 23. This bracket has a pair of forwardly diverging arms 24 adapted to engage under the rear edge portion of the bar 7, and at its rear the bracket 23 has a depending arm 25 through which passes a tie bolt 26, the latter of which is rendered adjustable through the action of a thumb screw 27. It will be seen that the forward pull by the tie bolt 26 will not only keep the hanger 22 in engagement with the rear edge of the bar 7, but will also maintain the bracket arms 24 up in proper contact with the rear portion of the lower surface of the bar 7.

At its upper end the hanger 22 has a bolt 28 which serves as a fulcrum for a cam 29, which cam in turn is provided with a manually operative adjusting arm 30. This arm may be comparatively short as it is not manipulated while any of the parts are under stress and strain, but is merely employed for the purpose of actuating the cam 29 to thereby initially set the vertical position of the bracket 23 before the resetting operation proper takes place. The arm 30 is provided with a laterally extending tooth 31 for selective engagement in various notches 32 of a segment 33, which segment is prevented from turning by a pair of lugs 34, which engage one side of the hanger 22. The segment is adjustably secured by a hand screw 35 which screws directly upon the bolt 28 but has direct bearing engagement with the segment block 33.

After the proper adjustment of the cam 29 has been made the nut 35 is tightened up so as to prevent disengagement of the tooth 31 from the notch 32 in which it may be engaged. It is preferable, though not essential, to provide the head end of the bolt with a short compression spring 36. When an adjustment in the position of the cam 29 is desired it is of course necessary to sufficiently loosen the nut 35 so that the rack 33 can be released from engagement with the tooth 31 of the lever 30. The lever 30 is then moved forwardly or rearwardly as occasion may require, and when the adjustment has been completed the nut 35 is again tightly screwed up into place so as to rigidly secure the supporting cam 29 in the desired position.

At the forward end of the bar 18 the device includes a yoke 37 which extends downwardly at both sides of the bar, and the two lateral arms converge as shown in Fig. 4 so as to form a tapered recess 38 for engagement by the front end of the guard 8. At its lower extremity the yoke 37 has a perforation to receive the front or head end of the tie bolt 26. At its upper end the yoke 37 has a bolt or rivet 39 which serves as a fulcrum for a cam 40 formed at one end of an arm 41. This arm 41, when raised from the horizontal position shown in Fig. 1 to and beyond the dotted line position, operates the cam 40 for the purpose of exerting the necessary lifting or resetting pressure on the guard 8; and by the lever arrangement shown, also simultaneously operates to exert a downward pressure on the bearing block 19 and an upward pressure on the bracket 23. Thus it will be seen that the entire stress will be applied directly to some part of the cutter mechanism, and there will be no tendency to force the cutter mechanism as such out of normal operating position with respect to other parts of the machine. The arm 41 is indicated as being comparatively short in length, and this is primarily for convenience in handling and transporting the device. A further reason, however, is that it is convenient with this structure to use a supplemental lever which is so designed that it may have other uses than merely operating the cam arm 41.

Thus it will be seen that I provide an elongated arm 42 which is preferably an ordinary piece of piping, and this arm is provided at one end with an H-shaped casting 43, and near this casting 43 the pipe 42 is provided with a yoke 44 which is adjustably secured to the pipe by a bolt 45, and the lower end of the yoke is generally U-shaped, as is the lower end of the yoke 37, so as to receive the outer or forward end of the arm 41. In order that the two members may properly fit together I preferably provide the arm 41 with stop lug 46 against which the casting 43 may stop, and at its rear end it is convenient to provide the arm 41 with a slight recess 47 to receive the yoke 44.

When applying the device to a cutter unit it is first of course necessary to seat the bearing block 19 upon the bar 7 or corresponding part, and immediately above where the downward pressure will be most effective. It is also preferable to see that the bar 18 is adjusted to substantially a horizontal position. Assuming now that the front and rear adjusting mechanisms have been put in place, and properly connected by the tie bolts 26, the next step is to release the nut 35 and move the cam 29 to the position where it will best support the bracket 24 immediately under the back portion of the bar 7. The nut 35 is then drawn up tightly so that the cam 29 cannot move, and the next operation is then to draw up the nut 27 so as to properly engage the yoke 37 with the forward end of the guard 8. During this time the arm 41 is in its inactive position so that the yoke 37 will be in its lowermost position.

The hand lever 42 is now pulled up and rearwardly so as to force the cam 40 downwardly with respect to the bar 18. This action will then obviously force the forward portion of the guard 8 upwardly, and this action may be gradual enough so that the operator can make the necessary observations and stop the upward movement as soon as the ledger plate 10 has been brought up into proper shearing contact with the adjacent cutter plate 12.

If there is a slight tendency of the guard to spring back, then it is only necessary to slightly exaggerate the upward movement so as to offset this springing tendency. After the guard has been properly reset it is obviously a simple matter to remove the device and apply it to the next guard.

In cutter structures of the binder or harvester type, the supporting bar 15, as already stated, is usually secured throughout its entire length to the receiving platform, and consequently the same safeguard need not be taken with reference to the possibility of twisting or distorting this bar, as is the case with mowers. Furthermore, as will be understood from Fig. 6, the binder type of cutter does not permit the use of a hanger device such as 22, and consequently the apparatus just described cannot ordinarily be used with this type of cutter. However, it will be seen that by using the supplemental lever arm 42 detached from the arm 41, I can also use a portion of the device for the purpose of resetting the platform supported type of cutter, as shown in Fig. 6. Thus, the H-shaped casting 43 has opposite recesses 48 for straddling the connector bolts such as 9 and thus securing a direct bearing engagement with the bar 15. Furthermore, by rendering the yoke 44 adjustable on the pipe 42 I can so arrange it that it can be used to engage the front end of the guard 8 in exactly the same manner as the yoke 37 engages the guard in the first described structure.

As this arrangement does not include a cam such as 40, to multiply the leverage, the same degree of resetting pressure cannot be delivered. However, it may be mentioned that the cutter structure of binders and other harvesters which are used entirely on small grain, is not as heavy as that which is required in mowers, which are subject to considerably greater strain and stress, and consequently the arrangement shown in Fig. 6 is sufficient to effect the resetting of the guards.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A device for resetting a guard and ledger plate of a mower or the like comprising a rectangular frame structure adapted to embrace the guard lengthwise and in a vertical plane therewith, said frame including an upper cross bar adapted to exert downward pressure at the rear of the guard, means depending from the bar to support the ledger plate, vertically adjustable means at the forward end of the bar to engage and lift the pointed front end of the guard, and means to prevent the vertically adjustable means from slipping forwardly out of lifting engagement with the guard point.

2. A guard and ledger plate resetting device for mowers and the like comprising a bar for disposition longitudinally over the guard and transversely over the guard supporting beam, a bearing member disposed under the bar for exerting downward pressure on the guard and beam intermediate the front and rear extremities thereof, an arm depending from the rear end of the bar and having a forward extension at its lower end to engage under the rear edge portion of the guard supporting beam, a vertically adjustable yoke extending down from the front end of the bar with a recess to receive the front, pointed end of the guard, and means to prevent the yoke from slipping forwardly out of engagement with the guard when pressure is applied by vertical adjustment of the yoke.

3. A guard and ledger plate resetting device for mowers and the like comprising a bar for disposition longitudinally over the guard and transversely over the guard supporting beam, a bearing member disposed under the bar for exerting downward pressure on the guard and beam intermediate the front and rear extremities thereof, an arm depending from the rear end of the bar and having a forward extension at its lower end to engage under the rear edge portion of the guard supporting beam, a vertically adjustable yoke extending down from the front end of the bar with a recess to receive the front, pointed end of the guard, and a tie rod disposed under the guard level, connecting the depending arm and yoke to prevent relative spreading thereof when the yoke is adjusted upwardly to reset the guard.

4. A guard and ledger plate resetting device for mowers and the like comprising a bar for disposition longitudinally over the guard and transversely over the guard supporting beam, a bearing member disposed under the bar for exerting downward pressure on the guard and beam intermediate the front and rear extremities thereof, an arm depending from the rear end of the bar, a bracket secured to the lower end of the arm and having a projection extending forwardly under the rear edge portion of the guard beam, a yoke projecting downwardly from the front end of the bar to releasably engage the guard point and apply upward pressure thereto, and a tie bolt connecting said yoke and bracket under the guard.

5. A guard and ledger plate resetting device for mowers and the like comprising a bar for disposition longitudinally over the guard and transversely over the guard supporting beam, a bearing member disposed under the bar for exerting downward pressure on the guard and beam intermediate the front and rear extremities thereof, an arm depending from the rear end of the bar, a bracket secured to the lower end of the arm and having a projection extending forwardly under the rear edge portion of the guard beam, a yoke projecting downwardly from the front end of the bar to releasably engage the guard point and apply upward pressure thereto, and a tie bolt connecting said yoke and bracket under the guard, said tie bolt having a nut threaded thereon to adjust the effective length thereof.

WALTER A. JOHNSON.